United States Patent
Zierolf

(10) Patent No.: US 6,178,370 B1
(45) Date of Patent: *Jan. 23, 2001

(54) DECELERATION BASED ANTISKID BRAKE CONTOLLER WITH ADAPTIVE DECELERATION THRESHOLD

(75) Inventor: Michael Lee Zierolf, South Burlington, VT (US)

(73) Assignee: The B. F. Goodrich Company, Akron, OH (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/023,155

(22) Filed: Feb. 12, 1998

(51) Int. Cl.⁷ .................. B60T 7/12; G06F 7/00
(52) U.S. Cl. .................. 701/71; 701/70; 701/75; 701/79; 303/138; 303/139; 303/167; 303/176; 303/126; 188/181 A; 188/181 C
(58) Field of Search .................. 701/70, 71, 73, 701/78, 79, 82; 303/163, 121, 182, 150, 112, 175, 156, 162, 157, 125, 126; 188/181 C, 181 R, 181 T

(56) References Cited

U.S. PATENT DOCUMENTS

| | | | |
|---|---|---|---|
| 4,043,607 | 8/1977 | Signorelli et al. | 303/100 |
| 4,078,845 * | 3/1978 | Amberg et al. | 301/107 |
| 4,653,816 * | 3/1987 | Lin | 701/78 |
| 4,679,866 | 7/1987 | van Zanten et al. | 303/104 |
| 4,715,662 | 12/1987 | van Zanten et al. | 303/109 |
| 4,764,871 | 8/1988 | van Zanten | 701/70 |
| 4,933,858 * | 6/1990 | Matsuda | 701/79 |
| 5,050,940 | 9/1991 | Bedford et al. | 701/78 |
| 5,072,393 * | 12/1991 | Mori et al. | 701/71 |
| 5,117,361 * | 5/1992 | Takayama et al. | 701/75 |
| 5,180,214 | 1/1993 | Yeh et al. | 701/71 |
| 5,281,009 * | 1/1994 | Kidston et al. | 701/79 |
| 5,371,677 | 12/1994 | Ehret et al. | 701/72 |

(List continued on next page.)

FOREIGN PATENT DOCUMENTS

| | | |
|---|---|---|
| 4329391 | 3/1995 | (DE) . |
| 9526287 | 10/1995 | (WO) . |

OTHER PUBLICATIONS

European Search Report dated Mar. 20, 2000 in relation to patent application No. 99300968.7–2315.
Mark L. Akey, "Fuzzy Logic, Anti–Skid Control for Commercial Trucks"; Magnavox Decision Support Systems Applied Center of Excellence, Fort Wayne, Indiana, SPIE vol. 2493, Mar. 1995, pp. 359–370.
Hutchinson, et al., "Applications of Minimum Variance Reduced–State Estimators", IEEE Transactions on Aerospace and Electronic Systems; Sep. 1975; pp. 785–794.
du Plessis, "Poor Man's Explanation of Kalman Filtering" Autonetics Division, Rockwell International; date unknown.
Kobayashi, et al., Estimation of Absolute Vehicle Speed Using Fuzzy Logic Rule–Based Kalman Filter Proceedings of the American Control Conference; Jun. 1995.

Primary Examiner—Jacques H. Louis-Jacques
(74) Attorney, Agent, or Firm—Renner, Otto, Boisselle & Sklar LLP

(57) ABSTRACT

An antiskid brake controller which utilizes measured wheel speed in order to provide brake control for a vehicle such as an aircraft. The measured wheel speed is differentiated to determine the deceleration of the wheel, and the controller then compares the deceleration to a predefined deceleration threshold. If the wheel decelerates faster than the deceleration threshold, the controller reduces the command pressure provided to the brakes by a scaling factor. Full command pressure may eventually be applied otherwise. The controller is capable of operating based only on measured wheel speed.

43 Claims, 5 Drawing Sheets

U.S. PATENT DOCUMENTS

| | | | |
|---|---|---|---|
| 5,424,942 | 6/1995 | Dong et al. | 364/164 |
| 5,454,630 | 10/1995 | Zhang | 701/78 |
| 5,551,769 | 9/1996 | Luckevich | 303/149 |
| 5,713,642 * | 2/1998 | Okazaki | 303/121 |
| 5,719,565 * | 2/1998 | Tsuno et al. | 701/70 |
| 5,918,951 * | 7/1999 | Rudd, III | 303/150 |
| 5,951,122 * | 9/1999 | Murphy | 303/163 |

* cited by examiner

DECELERATION BASED ANTISKID BRAKE CONTOLLER WITH ADAPTIVE DECELERATION THRESHOLD

TECHNICAL FIELD

The present invention relates generally to brake control systems, and more particularly to a deceleration based antiskid brake controller.

BACKGROUND OF THE INVENTION

Antiskid brake controllers have been in widespread use for many years. In the simplest sense, an antiskid brake controller compares the speed of a vehicle (e.g., automobile, aircraft, etc.) derived from a wheel speed sensor to the vehicle speed derived from a secondary or reference source. If the wheel is determined to be skidding an excessive amount, then brake pressure applied to the wheel is released and the wheel is allowed to spin back up to the appropriate speed.

A fundamental problem associated with virtually all antiskid brake controllers relates to determining an appropriate amount of skidding. Two types of controllers which are generally known utilize different techniques. The first type of antiskid controller is deceleration based. In short, the deceleration based controller differentiates the wheel speed to determine how fast the wheel speed is changing. If the wheel decelerates too quickly, there is said to be excessive skidding and the controller reduces the amount of pressure transmitted to the brakes.

A second type of antiskid controller relies on a model of the mu-slip curve which describes the tire-to-road surface friction characteristics. The difference between the wheel velocity and the vehicle velocity is referred to as the slip velocity. The slip velocity is compared with a predefined set point on the mu-slip curve in order to achieve a desired amount of skidding.

Antiskid controllers which are based on the mu-slip curve are oftentimes computationally complex and require multiple sensors for measuring wheel speed, vehicle speed, etc. Consequently, deceleration based antiskid controllers may be preferred as a simpler approach. However, deceleration based antiskid controllers in the past have not been sufficiently adaptive to adjust to varying tire/surface conditions (e.g., wet or icy conditions) insofar as determining an acceptable amount of skidding. Failure to adjust for varying conditions can result in the antiskid controller prematurely releasing brake pressure and/or failing to adequately control excessive skidding.

In view of the aforementioned problems associated with conventional antiskid brake controllers, there is a strong need in the art for a controller which is adaptive to handle changing tire/surface conditions. In addition, there is a strong need for such a controller which is not computationally intensive and which does not require multiple sensors, etc.

SUMMARY OF THE INVENTION

In an exemplary preferred embodiment, the antiskid brake controller of the present invention utilizes measured wheel speed in order to provide brake control for a vehicle such as an aircraft. The measured wheel speed is differentiated to determine the deceleration of the wheel, and the controller then compares the deceleration to a predefined deceleration threshold. If the wheel decelerates faster than the deceleration threshold, the controller reduces the command pressure provided to the brakes by a scaling factor. As the wheel begins to decelerate at a rate less than the deceleration threshold, the command pressure is increased until full command pressure is otherwise applied. The rate at which the controller reduces command pressure preferably is greater than the rate at which the controller otherwise increases command pressure. As a result, brake pressure may be decreased more quickly so as to avoid excessive skidding while at the same time brake pressure is increased more slowly so as to provide for smoother braking. The controller is capable of operating based only on measured wheel speed, thus additional sensors are not necessary. The wheel speed signal may be generated by an optical encoder, for example, located at the wheel itself.

The controller modifies the deceleration threshold based on the ability of the wheel to hold the requested brake pressure without excessive skidding. In the exemplary embodiment, the brake controller compares the wheel deceleration to a range including the deceleration threshold. If the wheel deceleration falls below the range, thus indicating the onset of excessive skidding, the value of the deceleration threshold is decreased. On the other hand, if the wheel deceleration goes beyond the range so as to indicate that the wheel can handle additional braking, the value of the deceleration threshold is increased. Preferably, the rate at which the controller decreases the deceleration threshold is greater than the rate at which the controller increases the deceleration threshold.

The brake controller also provides for increasing the deceleration threshold based on the detection of higher vehicle speeds. More specifically, the deceleration threshold is increased by a scaling factor at wheel speeds exceeding a predefined threshold. It has been found that a wheel typically can hold more deceleration at higher wheel speeds. Thus, for high speeds the value of the deceleration threshold is increased to provide for additional brake pressure applied to the wheel.

In addition, the brake controller includes protection against instantaneous wheel lock up. Specifically, the brake controller compares the estimated vehicle velocity with the measured wheel speed. In the event wheel lock up were to occur during a braking operation, pressure to the brake is released and the controller is reset.

According to one particular embodiment of the invention, an antiskid brake controller is provided for controlling a braking operation of a wheel of a vehicle based on a wheel speed signal provided by a wheel speed sensor coupled to the wheel. The controller includes means for estimating a deceleration of the wheel based on the wheel speed signal provided by the wheel speed sensor; comparison means for comparing the estimated deceleration of the wheel with a predefined deceleration threshold; and output means for providing a control signal for adjusting a brake force applied to the wheel based on the comparison, the control signal functioning to decrease the brake force applied to the wheel at a rate which is greater than a rate a which the control signal increases the brake force applied to the wheel.

According to another aspect of the invention, an antiskid brake controller is provided for controlling a braking operation of a wheel of a vehicle. The controller includes means for estimating a deceleration of the wheel based on the wheel speed signal provided by the wheel speed sensor; adaptive deceleration threshold means for providing a deceleration threshold which varies in accordance with a prescribed criteria; comparison means for comparing the estimated deceleration of the wheel with the deceleration threshold;

and output means for providing a control signal for adjusting a brake force applied to the wheel based on the comparison.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENT

Figure 1:
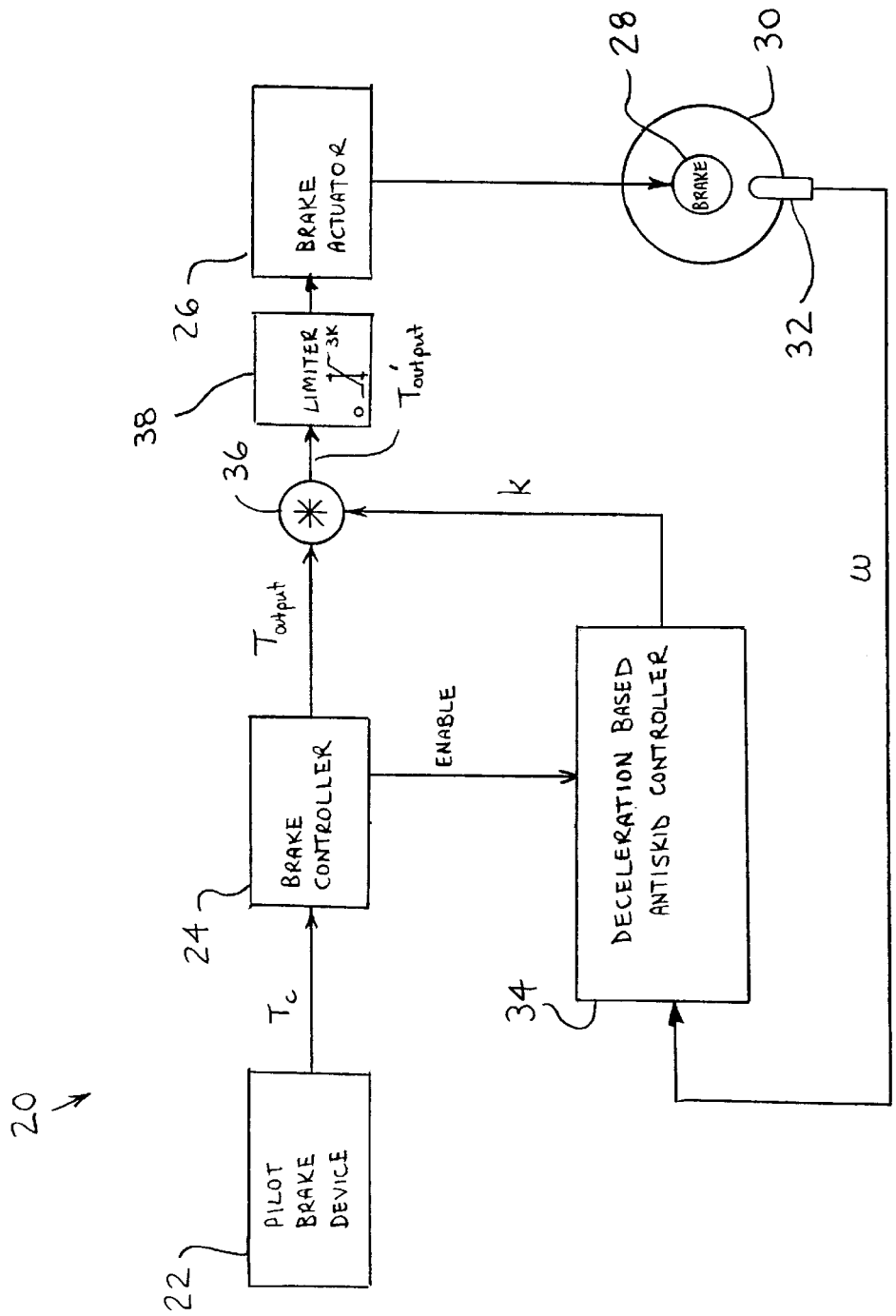
FIG. 1 is a block diagram of a brake system including a deceleration based antiskid controller with an adaptive deceleration threshold in accordance with the present invention.

Referring initially to FIG. 1, a brake control system as used in an aircraft in accordance with the present invention is generally designated 20. Generally speaking, brake control on an aircraft is usually structured in a paired wheel configuration for functional modularity. For example, if the aircraft has two wheels on the left side of the aircraft and two wheels on the right side, the outer two wheels form a pair and the inner two wheels form another pair. Within a pair there is a right wheel control and left wheel control. The left and right wheel control functions are uncoupled except for locked wheel protection. The basic unit therefore consists of control of a single wheel which can be left or right. As utilized herein, it will be appreciated that the term "wheel" is intended to refer collectively to both the wheel and tire.

For sake of simplicity, the brake control system 20 as shown in FIG. 1 represents the basic unit for providing brake control of a single wheel (left or right). However, it will be appreciated that control for the other wheel(s) can be provided via corresponding systems 20 or in a single system incorporating the same inventive principles. Moreover, the preferred embodiment of the present invention provides brake control in connection with an aircraft. Nevertheless, it will be appreciated that the brake control system and antiskid controller according to the present invention has utility for virtually any type of vehicle and is not limited necessarily to brake control for aircraft.

The system 20 includes a pilot brake device 22 for providing operator brake control. In addition, the system 20 includes a conventional brake controller 24. The controller 24 is designed to provide a control signal $T_{output}$ to a brake actuator 26 included in the system 20. The brake actuator 26 may be any conventional type actuator (e.g., hydraulic, pneumatic or electromechanical) for applying pressure to the brake material (not shown) in a brake assembly 28. The brake assembly 28 in turn provides braking action to a wheel 30 by exerting a braking torque or force on the wheel 30 as is conventional. The wheel 30 is coupled to the aircraft (or other vehicle) via a conventional structure (not shown).

The system 20 further includes a wheel speed sensor 32 which measures the angular velocity or speed of the wheel 30. The wheel speed sensor 32 may be any conventional sensor (e.g., optical encoder based, etc.) which provides an output signal ω indicative of the measured speed of the wheel 30.

The signal ω is input to a deceleration based antiskid controller 34 included in the system 20. As will be discussed in detail below, the controller 34 estimates the deceleration ω' of the wheel by differentiating (with respect to time) the measured wheel speed ω provided from the wheel speed sensor 32. The controller 34 then compares the deceleration ω' to a predefined deceleration threshold. Based on the comparison, the controller 34 outputs a control signal "k" which varies in value from 0 to 1. The control signal k is output by the controller 34 to a multiplier 36 which multiplies the brake control signal $T_{output}$ by the value of k. The resultant modified brake control signal $T_{output}'$ is output by the multiplier 36 to a limiter 38 and then to the brake actuator 26. The brake actuator 26 consequently applies a braking force to the wheel 30 based on the modified brake control signal $T_{output}'$. The limiter 38 serves to limit the maximum modified brake control signal $T_{output}'$ so as to avoid damage to the brake actuator 26 and/or the brake assembly 28.

As will be described more fully below in relation to FIGS. 2–4, the controller 34 effectively reduces the pilot pressure applied to the brake assembly 28 if the wheel 30 decelerates faster than the aforementioned predefined deceleration threshold by varying the value of k. In the event the wheel 30 decelerates at a rate which is below that of the predefined threshold, k will increase towards one where full pressure commanded by the pilot is applied to the brake assembly 28. In addition, the controller 34 is adaptive in the sense that it varies the predefined deceleration threshold based on the ability of the wheel 30 to hold a given amount of deceleration without excessive skidding. For example, the controller 34 adjusts the deceleration threshold downward in the event an icy or wet runway surface is encountered. On the other hand, the controller 34 may subsequently increase the deceleration threshold upon encountering a dry or normal runway surface. The controller 34 also responds to instantaneous lock up of the wheel 30 (e.g., due to an icy patch on the runway surface, etc.) by setting the value of k to zero and resetting the controller 34 as is discussed in detail below.

The controller 34 receives an ENABLE signal from the brake controller 24 so as to activate the controller 34 during a braking event (e.g., activation of the pilot brake device 22). During a braking event as determined by activation of the pilot brake device 22, the brake controller 24 provides an active ENABLE signal (i.e., a logic "1") to the controller 34. During a non-braking event when the pilot brake device 22 is not activated, the ENABLE signal is set to a logic "0".

Generally describing the operation of the system 20, the pilot brake device 22 comprises a pedal or equivalent thereof. During a braking event, the pilot of the aircraft activates the pilot brake device 22 by pushing the pedal (or its equivalent). The depression of the pedal is converted to an electrical signal (brake torque command signal $T_c$) which is provided to the controller 34. The value of the command signal $T_c$ is indicative of the degree of depression of the pedal, and is related to the amount of braking force requested by the pilot as is conventional. The controller 24 receives the command signal $T_c$ and outputs the brake control signal $T_{output}$ which is related to the command signal $T_c$. It will be appreciated that the control signal $T_{output}$ will be a pressure signal for a hydraulic brake of a force signal for an electric brake, for example. Concurrently, the controller 24 enables the controller 34 via the ENABLE signal. The control signal $T_{output}$ is provided to one input of the multiplier 36 which multiplies the control signal by the signal k provided by the controller 34 to the other input.

As mentioned above, the modified control signal $T_{output}'$ is limited by the limiter 38 prior to being input to the brake actuator 26. The brake actuator 26 in turn applies pressure to the brake assembly 28 based on the modified control signal $T_{output}'$ in an otherwise conventional manner. The applied brake pressure results in a reduction in the rotational speed of the wheel 30 which is measured by the wheel speed sensor 32 and fed back to the controller 34. Thus, the present invention provides closed loop brake control based on the deceleration of the wheel. In the exemplary embodiment the only input parameter is wheel speed, thus eliminating the need for additional sensors which add to complexity and cost.

Figure 2:
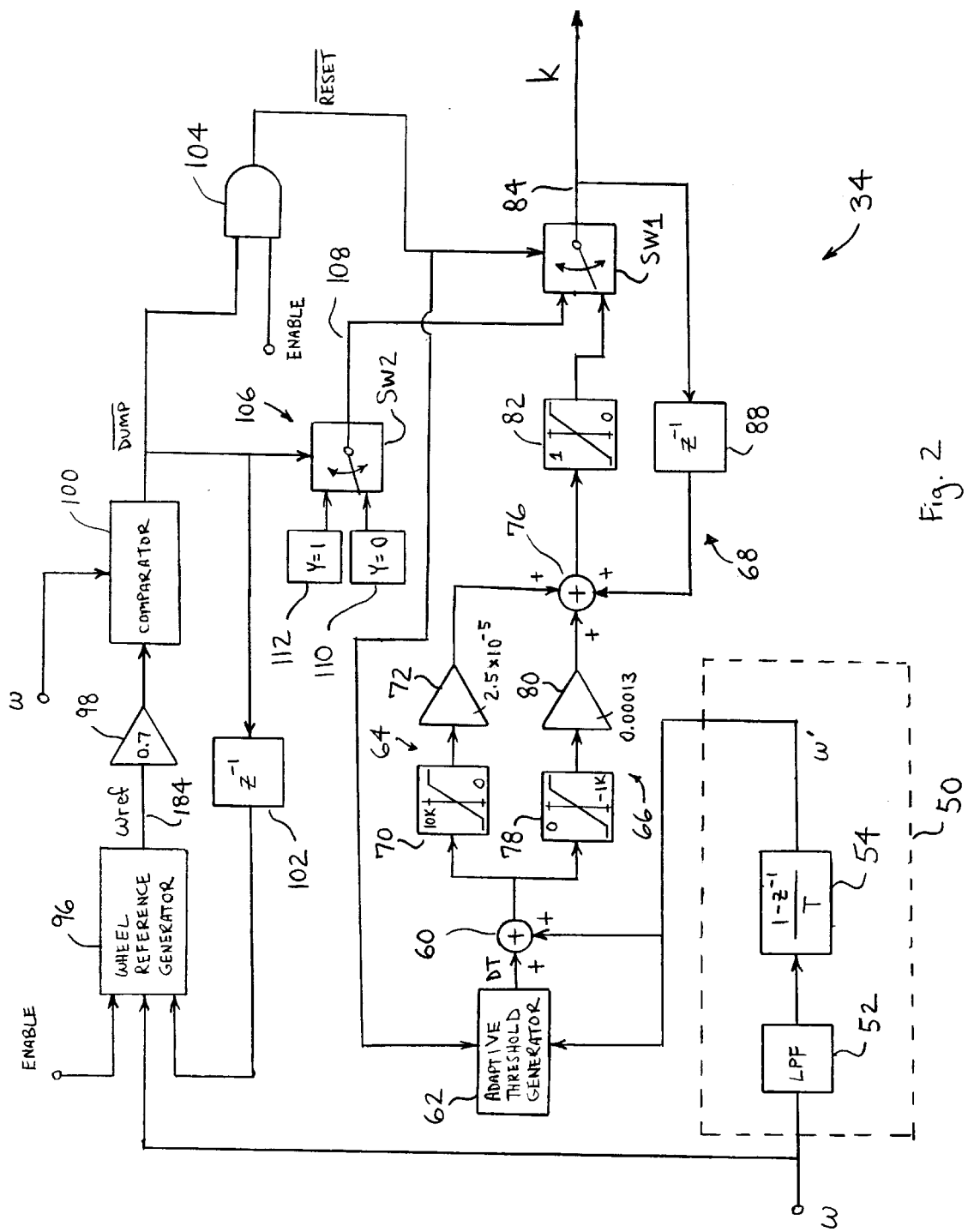
FIG. 2 is a detailed block diagram of the deceleration based antiskid controller in accordance with the exemplary embodiment of the present invention.

Referring now to FIG. 2, a detailed block diagram of the deceleration based antiskid controller 34 is shown. As will be appreciated, the controller 34 in the exemplary embodiment is a digital controller represented as operating in the z-domain. The measured wheel speed signal $\omega$ from the sensor 32 is sampled at a rate of 800 samples per second, although clearly other sampling rates could be used. Moreover, other digital or analog control techniques are possible and the precise implementation described herein should not be construed as limiting in scope.

As represented in FIG. 2, the measured wheel speed $\omega$ is input to a wheel speed filter/differentiator 50 included in the controller 34. The filter/differentiator 50 includes, for example, a first order, low-pass filter 52 with a cut-off frequency of 10 radians/second (rad/sec). The wheel speed signal $\omega$ is input to the filter 52 to remove any noise which is present in the signal $\omega$. Preferably, the filter 52 is designed so as not to introduce excess lag into the system as response time in antiskid controllers is essential. The filtered output from the filter 52 is then input to a differentiator 54 included in the filter/differentiator 50. The differentiator 54 determines the time derivative of the wheel speed signal $\omega$. As is known, the time derivative of the wheel speed signal $\omega$ corresponds to the acceleration (or deceleration) of the wheel 30. In the exemplary embodiment, the differentiator 54 is constituted by a rectangular finite-difference approximation differentiator for ease of implementation and low computational burden. For example, the differentiator 54 may have a transfer function of $(1-z^{-1})/T$. However, improved accuracy may be obtained with more sophisticated differentiators.

The output of the differentiator 54 represents the estimated deceleration of the wheel 30, denoted by the signal label $\omega'$. The deceleration signal $\omega'$ is input to an adder 60 included in the controller 34. An adaptive threshold generator 62 also included in the controller 34 provides as an input to the other input of the adder 60 a deceleration threshold signal DT. As will be described in more detail below in connection with FIG. 3, the adaptive threshold generator 62 determines the value of the deceleration threshold DT with which the wheel deceleration signal $\omega'$ is compared.

The deceleration threshold DT represents the maximum deceleration which the wheel 30 is considered to be able to hold without incurring excessive skidding. The particular value (or range of values) of DT is a design constant that is chose a priori. Ideally, the value of the deceleration threshold DT would only be a function of the maximum possible deceleration of the vehicle. In the case of the aircraft, the maximum possible deceleration may be 0.6 g. In reality, however, the rolling radius of the wheel is not precisely known due to variations in tire pressure, etc. (which affect wheel speed). In addition, noise may still be present in the measured wheel speed signal. Thus, the maximum value of DT may be preselected as slightly greater than the theoretical value to prevent over-aggressive control.

The value of the deceleration signal $\omega'$ will be negative at times when the wheel 30 is decreasing in rotational speed, and is positive when the rotational speed of the wheel 30 is increasing. The value of the deceleration threshold DT, on the other hand, will be positive. Both the deceleration signal $\omega'$ and the deceleration threshold DT are input to positive inputs of the adder 60. As a result, if the deceleration of the wheel 30 exceeds the deceleration threshold DT in the sense that the wheel 30 is decelerating at a rate greater than a rate of DT, the output of the adder 60 will go negative (i.e., $\omega'+DT<0$). On the other hand, if the deceleration of the wheel 30 is less than the deceleration threshold DT, the output of the adder 60 will go positive (i.e., $\omega'+DT>0$).

The output of the adder 60 is input to a positive gain block 64 and a negative gain block 66 which both lead to a limited integrator 68 included in the controller 34. The gain blocks 64 and 66 leading to the limited integrator 68 are design parameters which add stability to the controller 34. If the output of the adder 60 was to pass directly to the limited integrator 68, the controller output 34 would tend to change nearly instantaneously from 1 to 0 or 0 to 1. In order to avoid such a "bang-bang" effect, the input to the limited integrator 68 is scaled so the controller output accumulates more smoothly. There are two gain terms instead of one (one for a positive error signal, the other for a negative error signal). This allows the controller 34 to decrease pressure applied to the brake assembly 28 more quickly than the controller 34 would increase the pressure.

Specifically, the output from the adder 60 is input to a positive limiter 70 which limits the positive error signal output from the adder 60 to within a predefined positive range (e.g., 0 to 10,000). The limited output from the limiter 70 is input to a positive gain amplifier 72 having a nominal gain of $2.5 \times 10^{-5}$. The output of the amplifier 72 is provided to an input of an adder 76 representing the input of the limited integrator 68.

Regarding the negative gain block 66, the output from the adder 60 is also input to a negative limiter 78 which limits the negative error signal output from the adder 60 to within a predefined negative range (e.g., 0 to −1000). The limited output from the limiter 78 is input to a negative gain amplifier 80 having a nominal gain of $13 \times 10^{-5}$. The output of the amplifier 80 is provided to another input of the adder 76. It will be appreciated that the particular limits and gain values for the limiters and amplifiers described herein are merely exemplary. Such values are not intended to limit the scope of the invention.

The output of the adder 76 is provided to a limiter 82 included in the limited integrator 68. The limiter 82 has a range of 0 to 1 which, as will be appreciated, defines the range of the value of k which is output by the controller 34 for scaling the brake control signal $T_{output}$. The output from the limiter 82 is connected to one terminal of a two-position switch SW1. The pole terminal of the switch SW1 represents the output of the limited integrator 68 at line 84.

The output of the limited integrator 68 is fed back to a third input of the adder 76 via a delay block 88 as shown. During normal operation (i.e., when the controller 34 is not being reset at startup or due to a detected lock-up condition as explained more fully below) the switch SW1 couples the output of the limiter 82 to the limited integrator 68 output at line 84. Accordingly, if the estimated deceleration ω' generally remains below the deceleration threshold DT over a series of samples, the output of the limited integrator 68 will trend towards a value of 1. Similarly, if the deceleration ω' generally exceeds the deceleration threshold DT over a series of samples, the output of the limited integrator 68 will trend towards a value of 0. The particular rates at which the output of the limited integrator 68 trends up or down depends on the gain of the amplifiers 72 and 80 as well as the value of ω' as will be appreciated. The output from the limited integrator 68 at line 84 represents the signal k which is output by the controller 34.

The controller 34 further includes a wheel reference generator 96. As will be described more fully below in connection with FIG. 4, the wheel reference generator 96 includes a rate limiter which operates based on the maximum rate at which the vehicle (e.g., the aircraft) could physically decelerate. Specifically, the wheel reference generator 96 provides a reference signal ωref that represents the rate limited speed of the wheel. The rate at which the reference signal ωref can vary is limited by the theoretical maximum rate at which the vehicle itself can be decelerated. Such theoretical maximum can be calculated based on known physical properties of the vehicle (e.g., mass, etc.).

The reference signal ωref from the generator 96 is input to an amplifier 98 having a gain less than one (e.g., 0.7). The output of the amplifier 98 is input to a comparator 100 included in the controller 34. Also input to the comparator 100 is the measured wheel speed ω from the sensor 32 (FIG. 1). The comparator 100 is configured to compare the measured wheel speed ω to the wheel reference signal ωref. If the measured wheel speed ω is less than the reference signal ωref by a predetermined amount (e.g., 30% as determined by the gain of the amplifier 98), it is judged that the wheel 30 must be in lock-up condition since the wheel 30 could not have decelerated so quickly without incurring lock-up. Under such condition, the comparator 100 outputs an active DUMP-bar signal having a logic value of 0. Otherwise, if the measured wheel speed ω does not fall below the reference signal ωref by the predetermined amount, the comparator 100 outputs a DUMP-bar signal having a logic value of 1.

The output of the comparator 100 (i.e., the DUMP-bar signal) is fed back to the wheel reference generator 96 via a delay block 102 as shown in FIG. 2. In addition, the wheel reference generator 96 receives as an input the ENABLE signal from the controller 24. The specific operation of the wheel reference generator 96 is discussed below with reference to FIG. 4.

It is noted that the DUMP-bar signal from the comparator 100 is provided to an input of a two-input AND gate 104. The other input of the AND gate 104 is coupled to the aforementioned ENABLE signal which is active (i.e., a logic 1) during a braking event. If, during a braking event, a lock-up condition occurs, the output of the AND gate 104 will be low providing as an output signal an active RESET-bar signal equal to 0. The RESET-bar signal serves as a control signal to the switch SW1 to determine the position thereof. Specifically, when the RESET-bar signal is non-active (i.e., equal to 1) the switch SW1 is in its normal position for connecting the output of the limiter 82 to the output line 84 of the limited integrator 68. On the other hand, when the RESET-bar signal is active (i.e., equal to 0), the switch SW1 disconnects the output of the limiter 82 from the output line 84.

Connected to the other terminal of the switch SW1 is the output of an initial condition section 106 included in the controller 34. When the RESET-bar signal is active, the switch SW1 connects line 108 (representing the output of the initial condition section 106) to the output line 84 of the limited integrator 68. In the event of a lock-up condition during a braking event when the DUMP-bar signal is active, the signal on line 108 is set equal to 0. Consequently, the output of the limited integrator 68 is reset to 0 as k also goes to 0 and brake pressure is released.

The initial condition section 106 includes a two-position switch SW2 having its pole terminal connected to the output line 108. Connected to one terminal of the switch SW2 is an initial condition value of Y=0 represented by block 110. Connected to the other terminal of the switch SW2 is an initial condition value of Y=1 as represented by block 112. The position of the switch SW2 is controlled by the value of the DUMP-bar signal. When DUMP-bar is active (i.e., equal to 0), the switch SW2 couples the value of Y=0 onto line 108 as previously mentioned.

On the other hand, during start up or initialization of the controller 34 prior to any braking event, it is desirable to initialize the limited integrator 68 by setting its output equal to 1. Thus, during start up or initialization (i.e., prior to a braking event) DUMP-bar is non-active (i.e., equal to 1). This causes the switch SW2 to connect the initial condition value of Y=1 onto line 108. At the same time, since a braking event is not yet occurring the ENABLE signal input to the AND gate 104 will be a logic 0. Hence, the RESET-bar signal will go active causing the switch SW1 to couple the initial condition value of 1 on line 108 to the output of the limited integrator 68 on line 84. As a result, prior to a braking event the output of the controller 34 will be k=1.

Figure 3:
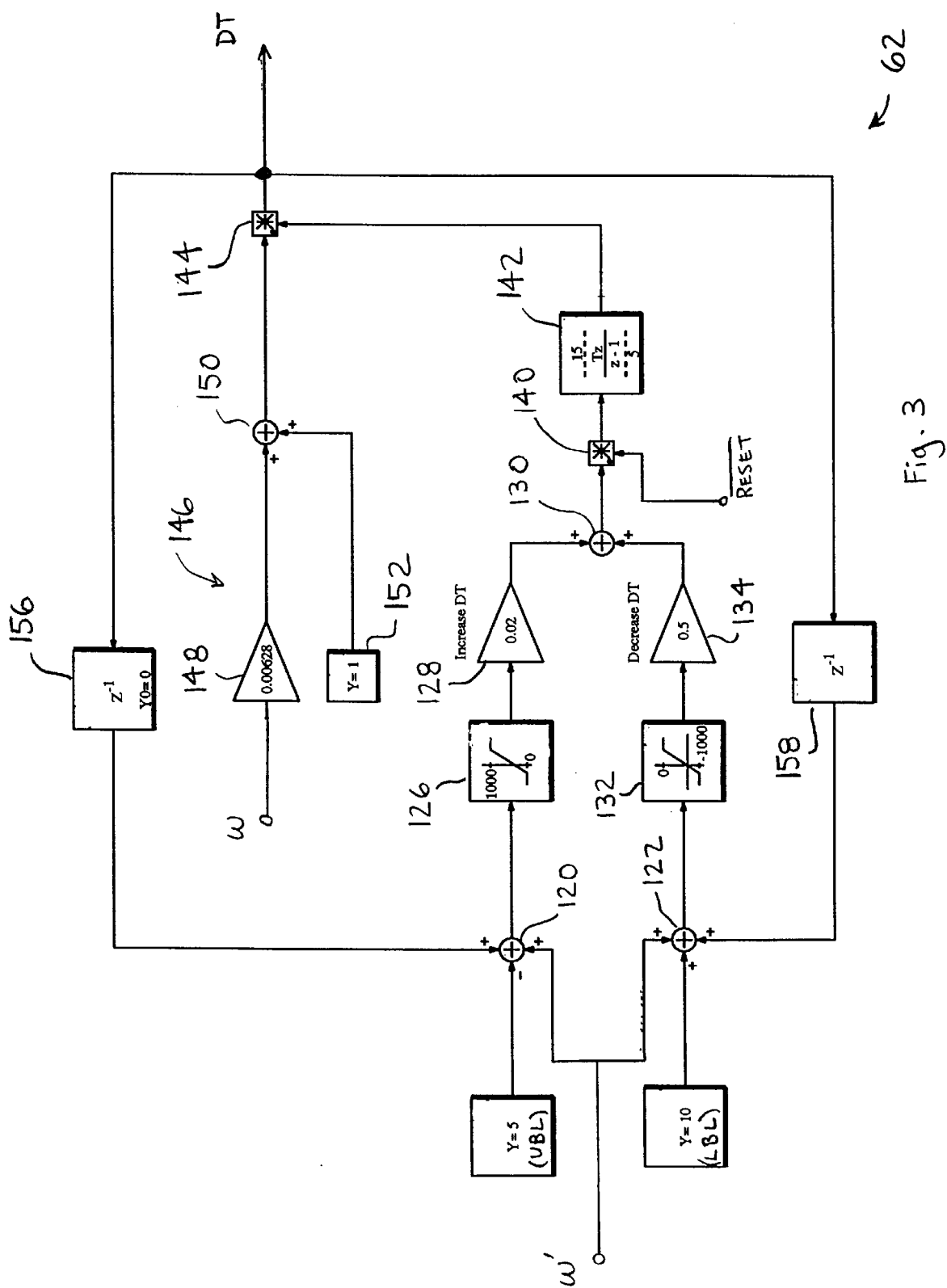
FIG. 3 is a detailed block diagram of the adaptive deceleration threshold generator included in the antiskid controller in accordance with the present invention.

Turning now to FIG. 3, the operation of the adaptive threshold generator 62 will be described in detail. The generator 62 is made up primarily of a limited integrator which receives as its input the estimated wheel deceleration signal ω' as provided from the output of the differentiator 54 (FIG. 2). The deceleration signal ω' is input to a positive input of each of adders 120 and 122 included in the generator 62. Also input to a negative input of the adder 120 is a predetermined constant representing an upper band limit (UBL) for the range of permissible values of the deceleration threshold DT beyond the previous value of DT. Similarly, also input to another positive input of the adder 122 is a predetermined constant representing a lower band limit (LBL) for the range permissible values of the deceleration threshold DT below the previous value of DT. The values of LBL and UBL are predetermined based on the desired response characteristics of the controller 34. As will be appreciated, as long as the deceleration signal ω' remains within the range defined by LBL, UBL and the previous value of DT, then the generator 62 will not modify the value of DT which is output as the deceleration threshold, with the exception of any scaling that may result as a result of the multiplier 144.

On the other hand, if the value of ω' decreases below the value of LBL the generator 62 reduces the value of the deceleration threshold DT to reflect the inability of the wheel 30 to hold the current amount of deceleration. Conversely, if the value of ω' increases above the value of UBL the generator 62 increases the value of the deceleration threshold DT to reflect the ability of the wheel to hold the current amount of deceleration.

In the exemplary embodiment, the values of UBL and LBL are nominally set at 5 and 10 units, respectively. Each of the adders 120 and 122 receive as a third input the value of DT from the previous sample as will be shown. If the deceleration signal ω' becomes greater than the current value of DT plus 5 (i.e., ω'>DT+5) then the generator 62 will gradually increase the value of DT. If the deceleration signal ω' becomes less than the current value of DT minus 10 (i.e., ω'<DT−10), on the other hand, the generator 62 will more rapidly decrease the value of DT. If the deceleration signal ω' remains within the range DT−10<ω'<DT+5, the value of the deceleration threshold DT is left unchanged.

As represented in FIG. 3, the output of the adder 120 will go positive if the deceleration signal ω' exceeds DT+5. The output of the adder 120 is input to a limiter 126 having a predefined positive range (e.g., from 0 to 1000). The output of the limiter 126 is input to a positive gain amplifier 128 for increasing the value of DT. The output of the amplifier 128 is input to an adder 130 as shown. On the other hand, the output of the adder 122 will go negative if the deceleration signal ω' falls below DT−10. The output of the adder 122 is input to a limiter 132 having a predefined negative range (e.g., from 0 to −1000). The output of the limiter 126 is input to a negative gain amplifier 134 for decreasing the value of DT. The output of the amplifier 134 is combined with the output of the amplifier 128 via the adder 130.

The desired effect on the value of DT is that if the wheel 30 incurs generally icy or wet surface conditions (i.e., over a prolonged period of time) during a braking event, the value of DT will be decreased by the generator 62 as a result of the wheel 30 being unable to hold the requested amount of deceleration. Similarly, if the wheel 30 incurs dry surface conditions which results in its being able to hold the deceleration over a prolonged period of time during a braking operation, the generator 62 will tend to increase the value of DT back to its predesigned level.

In the preferred embodiment, the gain of the amplifier 134 is greater than the gain of the amplifier 128. For example, the gain of the amplifier 134 may be set to 0.5 and the gain of the amplifier 128 set to 0.02. Consequently, the rate at which the value of DT is decreased is twenty-five times faster than the rate at which the value of DT is increased by the generator 62. Different gains for the amplifiers 128 and 134 may be selected without departing from the scope of the invention, although it is preferred that the value of DT be decreased at a faster rate. This is because it is desirable that DT increase towards a desired value more slowly for a smoother response. However, should DT overshoot the desired value then DT will decrease quickly for improved control.

The output from the adder 130 represents a composite error signal which is input to a multiplier 140. The other input of the multiplier 140 receives the RESET-bar signal from the AND gate 104 (FIG. 2). During a braking event which does not involve the detection of a lock-up condition (i.e., DUMP-bar=1), RESET-bar will be equal to 1 and hence the output of the adder 130 is provided to the output of the output of the multiplier 140. During a non-braking event or a lock-up condition (i.e., DUMP-bar=0), on the other hand, RESET-bar will be equal to 0 and thus the output of the multiplier 140 is held at zero.

The output of the multiplier 140 is provided to a limited integrator block 142 which defines the adaptation logic and limits for the deceleration threshold DT. In the exemplary embodiment, the integrator block 142 has a transfer function of $Tz/(z-1)$ by which the output of the multiplier 140 is multiplied to produce an output on line 144. T represents the sampling period. The integrator block 142 has predefined upper and lower limits (e.g., 15 and 5, respectively) designed to correspond with predefined maximum and minimum expected coefficients of friction (e.g., 0.6 and 0.1, respectively). The particular limits for the integrator block 142 may be determined empirically, for example.

Accordingly, during a braking event the output of the integrator block 142 is determined by the output of the adder 130. If, on the other hand, a lock-up condition occurs or a non-braking event takes place, RESET-bar will be equal to 0 and thus the output of the multiplier 140 is held at zero. Consequently, the output of the integrator block 142 will remain constant during such time. In the exemplary embodiment, the output of the integrator block 142 is held constant during a lock-up condition (i.e., RESET-bar=0) because it is expected that the lock-up condition occurred due to a brief aberration in the wheel-runway surface friction conditions. For example, the wheel 30 may have incurred a patch of ice or water on the runway. It is desirable for the generator 62 to hold the current value of DT during such time as the aberration is expected to be over relatively quickly. On the other hand, the generator 62 will tend to increase/decrease the value of the deceleration threshold DT over a longer period of time via the positive and negative gain amplifiers 128, 134, etc. to compensate for generally icy or wet runway surface conditions, for example.

The output from the integrator block 142 represents basically the unscaled value of DT which is input to a multiplier 144. A scaling circuit 146 included in the generator 62 provides a function of scaling the value of DT which is output from the integrator block 142 upward at higher wheel speeds. It has been found that the wheel 30 can hold a higher degree of deceleration at higher speeds without skidding. Thus, the scaling circuit 146 receives as an input the measured wheel speed ω from the sensor 32. The measured wheel speed ω is multiplied by an amplifier 148 having a gain of g, where g<1. The output of the amplifier 148 is input to an adder 150. The adder 150 receives at another input a constant value of Y=1 as represented by block 152. Hence, the output of the adder 150 corresponds to a scaling factor of 1+gω. The output of the adder 150 is input to the other input of the multiplier 144 such that the output of the integrator block 142 is scaled by the scaling factor of 1+gω. The output of the multiplier 144 thus represents the deceleration threshold DT output by the generator 62. The value of g in the exemplary embodiment is 0.00628, although another value could be selected based on the ability of the wheel to hold additional deceleration at higher speeds.

It is noted that the value of DT is fed back via delay blocks 156 and 158 to the adders 120 and 122, respectively. Consequently, the adders 120 and 122 compare the current deceleration ω' with the previous value of DT in order to generate error signals provided to the limiters 126 and 132 as explained previously.

Figure 4:
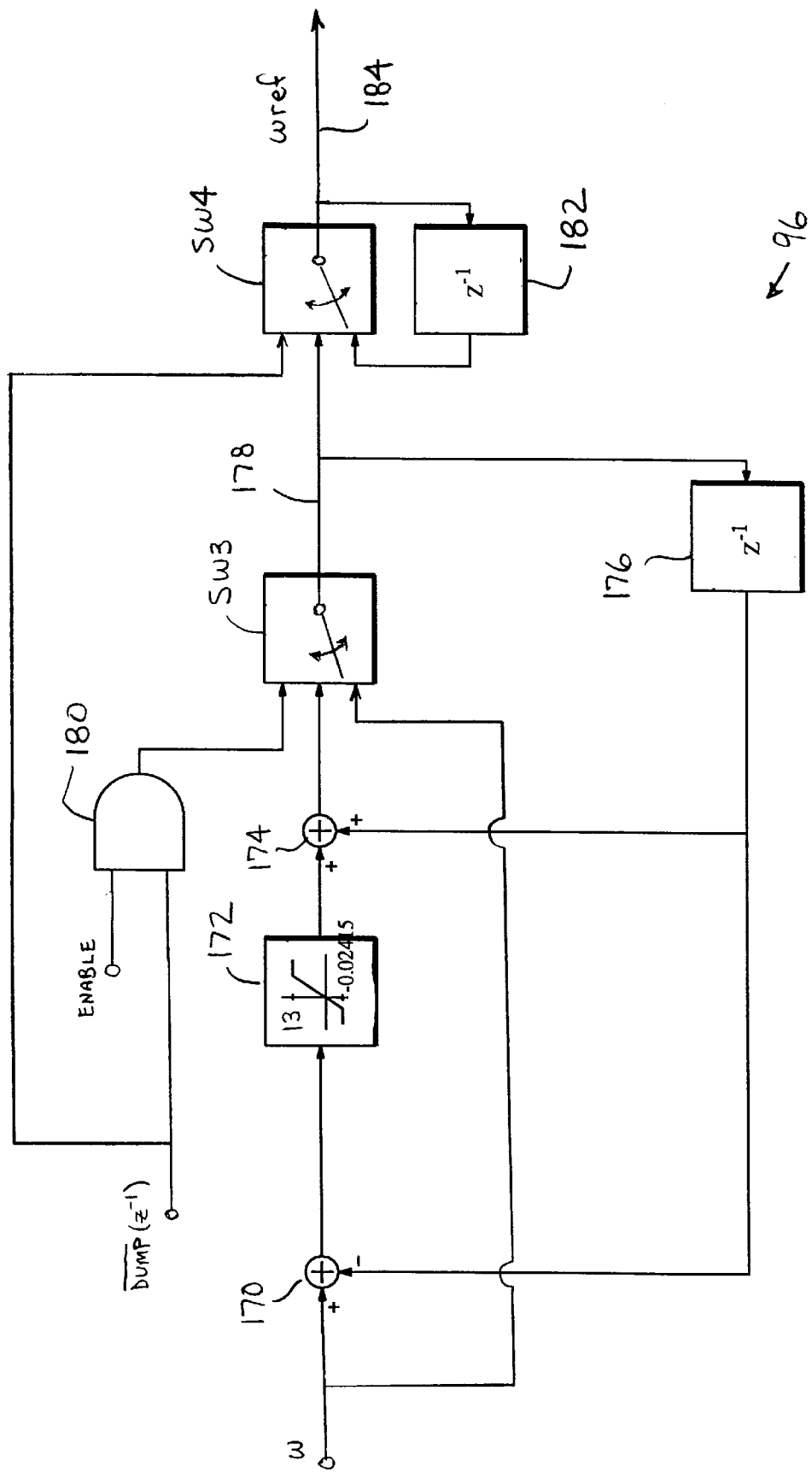
FIG. 4 is a detailed block diagram of the wheel reference generator included in the antiskid controller in accordance with the present invention.

Turning now to FIG. 4, a detailed diagram of the wheel reference generator 96 is shown. As described previously, the wheel reference generator 96 produces a wheel reference signal ωref limited by the maximum rate at which the vehicle could physically decelerate. The measured wheel speed ω from the sensor 32 is input to an adder 170 included in the generator 96. The output of the adder 170 is input to a limiter 172. The upper limit of the limiter 172 is a predetermined relatively large value (e.g., 13) which will in essence allow the reference signal ωref to increase quickly upon spin-up of the wheel 30 as is desirable.

The lower limit of the limiter 172, on the other hand, is predetermined value chosen to reflect the maximum rate at which the vehicle (e.g., the aircraft) physically could decelerate. Assuming the aircraft in the exemplary embodiment could physically be decelerated at a maximum rate of 0.6 g, and a given sample period of the controller 34 of 0.00125 second, the lower limit of the limiter 172 is set for −0.02415, keeping in mind the relationship between the angular velocity of the wheel and the linear velocity of the aircraft.

The output of the limiter 172 is input to another adder 174. The output of the adder 174 is provided to one terminal of a switch SW3 included in the generator 96. The measured wheel speed ω from the sensor 32 is input directly into the other terminal of the switch SW3. The position of the switch SW3 determines whether the rate limited value of the measured wheel speed ω or the measured wheel speed ω itself is fed back through a delay block 176 to the adders 170 and 174. Specifically, the pole of the switch SW3 on line 178 is connected to the input of the delay block 176. The output of the delay block 176 is coupled to a positive input of the adder 174 and to a negative input of the adder 170.

The position of the switch SW3 is controlled by the output of a two-input AND gate 180. When the output of the AND gate 180 is a logic 1, the switch SW3 couples the output on line 178 to the output of the adder 174. On the other hand, when the output of the AND gate 180 is a logic 0 the switch SW3 couples the output on line 178 to the measured wheel speed ω itself. One input of the AND gate 180 is the ENABLE signal provided by the brake controller 24 (FIG. 1) and which is active (i.e., ENABLE=1) during a braking event. The other input to the AND gate 180 is the delayed DUMP-bar signal provided to the generator 96 from the output of the delay block 102 (FIG. 2).

The output from the switch SW3 on line 178 is also input to one terminal of a second switch SW4 included in the generator 96. The other terminal of the switch SW4 is coupled to the output of a delay block 182. The pole terminal of the switch SW4 is coupled to output line 184 which provides the output signal ωref of the generator 96. As shown, the output on line 184 is also coupled to the input of the delay block 182. The position of the switch SW4 is controlled by the delayed DUMP-bar signal provided by the delay block 102 (FIG. 2). When the delayed DUMP-bar signal is non-active (i.e., equal to 1), the switch SW4 couples the output on line 178 to line 184. If the delayed DUMP-bar signal goes active (i.e., equal to 0) on the other hand, the switch SW4 couples the output of the delay block 182 to line 184.

Accordingly, during a normal braking event when the DUMP-bar signal is non-active the rate limited wheel speed provided by the limiter 172 is output by the generator as the reference signal ωref. In the event a lock-up condition is detected and the DUMP-bar signal goes active during a braking event, the switch SW3 couples the measured wheel speed ω to the output line 184 as the reference signal ωref. The switch SW4 in turn causes the value of the reference signal ωref output on line 184 to be fed back through the delay block 182. As a result, during a "dump" of brake pressure when the DUMP-bar signal is active, the reference signal ωref on line 184 is held at the value of the measured wheel speed ω at the beginning of the "dump".

During a "dump", the measured wheel speed ω will increase as a result of the wheel 30 spinning up following the release of brake pressure. The comparator 100 (FIG. 2) will detect when the measured wheel speed ω increases to within the predefined fraction of the measured wheel speed ω at the beginning of the dump. At such time, the DUMP-bar signal will go inactive indicating the end of the "dump" or brake pressure release. The measured wheel speed ω at the end of the dump is held by the delay block 176 and is fed back to the adders 170 and 174. Consequently, the measured wheel speed ω at the end of the dump serves initially as the reference signal ωref. Furthermore, during a non-braking event when the ENABLE signal is a logic 0 the reference signal ωref is initially set to the measured wheel speed ω by virtue of the switches SW3 and SW4.

Figure 5:
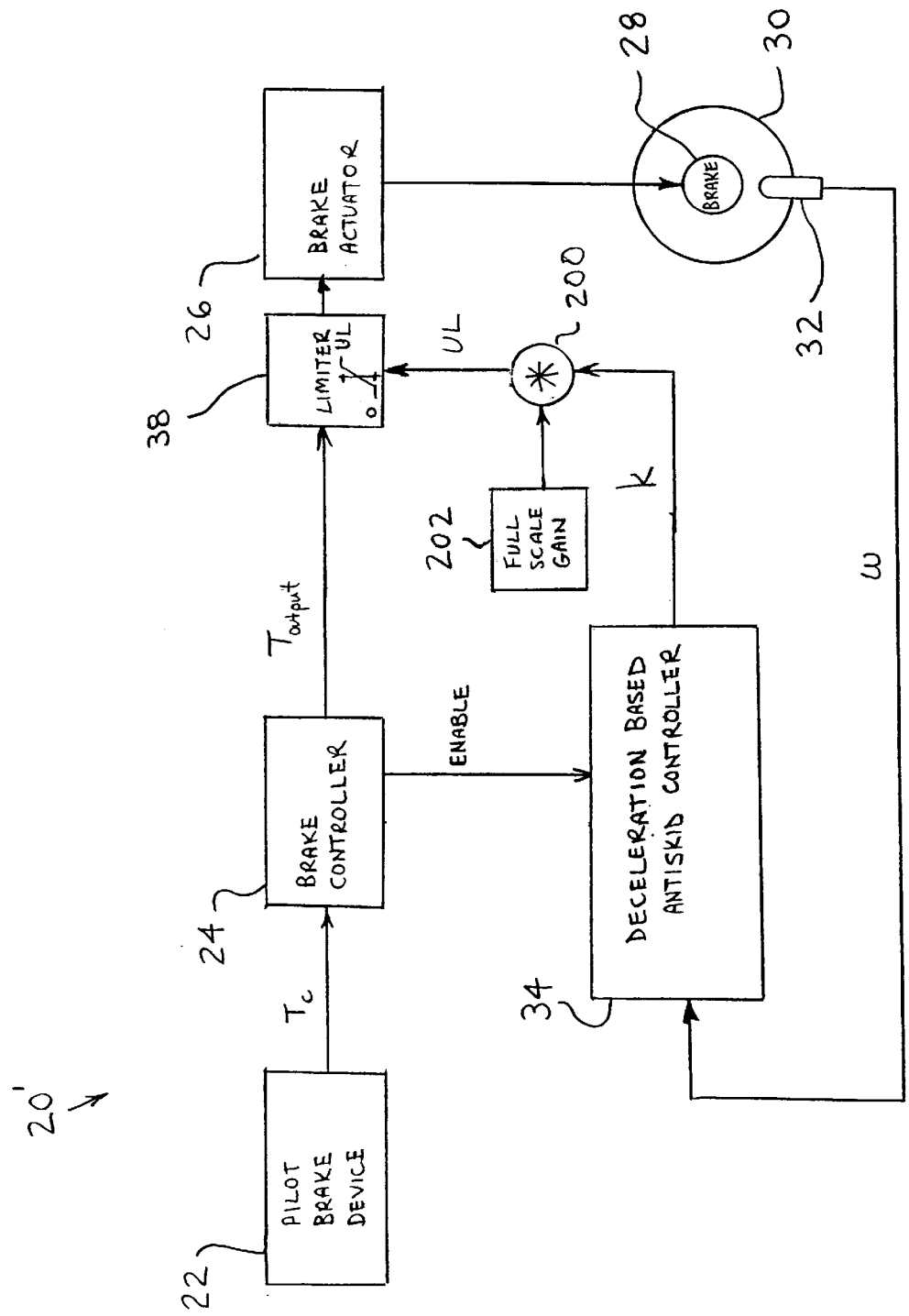
FIG. 5 is a block diagram of a brake system in accordance with another embodiment of the invention.

Referring briefly to FIG. 5, another embodiment of the brake control system, denoted 20', is shown in accordance with the present invention. In this embodiment, the control signal k adjusts the brake force applied to the wheel by controlling the limits of the limiter 38 rather than by directly scaling the brake control signal $T_{output}$ as in the embodiment of FIG. 1.

More specifically, the control signal k from the controller 34 is input to a multiplier 200. The multiplier 200 receives at its other input the nominal upper limit for the limiter 38, as represented by a full scale gain block 202. In the embodiment of FIG. 1, such full scale gain or upper limit was 3000, for example, and such value may be input to the multiplier 200 from block 202. The multiplier 200 scales the full gain value by the factor k to produce an upper limit (UL) output signal which is input to the limiter 38. The limiter 38 is designed to use as its upper limit the current value of UL as provided by the multiplier 200.

Accordingly, as the value of k varies from zero to one as described above, the maximum brake control signal which is passed on to the brake actuator 26 is controlled. It has been found that control of the upper limit of the limiter 38 based on the value of k provides smooth antiskid control.

In view of the above, it will be appreciated that the antiskid brake controller of the present invention utilizes measured wheel speed in order to provide brake control for a vehicle such as an aircraft. The measured wheel speed is differentiated to determine the deceleration of the wheel, and the controller then compares the deceleration to a predefined deceleration threshold. If the wheel decelerates faster than the deceleration threshold, the controller reduces the command pressure provided to the brakes by a scaling factor. Full command pressure may eventually be applied otherwise. The controller is capable of operating based only on measured wheel speed, thus additional sensors are not necessary.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. An antiskid brake controller for controlling a braking operation of a wheel of a vehicle based on a wheel speed signal provided by a wheel speed sensor coupled to the wheel, the controller comprising:

means for estimating a deceleration of the wheel based on the wheel speed signal provided by the wheel speed sensor;

comparison means for comparing the estimated deceleration of the wheel with a predefined deceleration threshold adaptive to braking conditions, the predefined deceleration threshold being adaptive to braking conditions by increasing or decreasing in increments which vary in size as a function of a difference between the estimated deceleration and the predefined deceleration threshold; and output means for providing a control signal for adjusting a brake force applied to the wheel based on the comparison, the control signal functioning to decrease the brake force applied to the wheel at a rate which is greater than a rate at which the control signal increases the brake force applied to the wheel.

2. The controller of claim 1, wherein the control signal causes the brake force applied to the wheel to be decreased in larger increments than the brake force is increased based on the comparison.

3. The controller of claim 2, wherein the output means comprises a first rate limiter and a first gain amplifier for causing the control signal to be decreased at a first rate based on the comparison, and a second rate limiter and second gain amplifier for causing the control signal to be increased at a second rate based on the comparison, the first rate being greater than the second rate.

4. The controller of claim 1, further comprising means for generating the predefined deceleration threshold.

5. The controller of claim 4, wherein the means for generating is adaptive to vary the predefined deceleration threshold based on the wheel speed signal.

6. The controller of claim 5, wherein the means for generating varies the predefined deceleration threshold based on a difference between the estimated deceleration and the predefined deceleration threshold from a previous interval.

7. The controller of claim 1, further comprising means for detecting a lock-up condition by comparing the wheel speed signal with a reference signal.

8. The controller of claim 7, wherein the reference signal is represented by the wheel speed signal after having been rate limited in accordance with a predefined maximum rate at which the vehicle could be decelerated.

9. An antiskid brake controller for controlling a braking operation of a wheel of a vehicle based on a wheel speed signal provided by a wheel speed sensor coupled to the wheel, the controller comprising:

means for estimating a deceleration of the wheel based on the wheel speed signal provided by the wheel speed sensor;

comparison means for comparing the estimated deceleration of the wheel with a predefined deceleration threshold adaptive to braking conditions wherein the predefined deceleration being adaptive to braking conditions by increasing or decreasing in increments which vary in size as a function of a difference between the estimated deceleration and the predefined deceleration threshold;

output means for providing a control signal for adjusting a brake force applied to the wheel based on the comparison, the control signal functioning to decrease the brake force applied to the wheel at a rate which is greater than a rate at which the control signal increases the brake force applied to the wheel; and means for generating the predefined deceleration threshold, wherein the means for generating varies the predefined deceleration threshold using a scaling factor incorporating the measured wheel speed represented by the wheel speed signal.

10. An antiskid brake controller for controlling a braking operation of a wheel of a vehicle based on a wheel speed signal provided by a wheel speed sensor coupled to the wheel, the controller comprising:

means for estimating a deceleration of the wheel based on the wheel speed signal provided by the wheel speed sensor;

adaptive deceleration threshold means for providing a deceleration threshold which varies in accordance with a prescribed criteria, whereby the deceleration threshold increases or decreases in increments which vary in size as a function of a difference between the estimated deceleration and the predefined deceleration threshold;

comparison means for comparing the estimated deceleration of the wheel with the deceleration threshold; and output means for providing a control signal for adjusting a brake force applied to the wheel based on the comparison.

11. The controller of claim 10, wherein the adaptive deceleration threshold means varies the deceleration threshold based on whether the estimated deceleration falls within a prescribed range of the deceleration threshold from a previous interval.

12. The controller of claim 10, wherein a rate at which the adaptive deceleration threshold means increases the deceleration threshold is less than a rate a which the adaptive deceleration threshold means decreases the deceleration threshold.

13. The controller of claim 10, wherein the adaptive deceleration threshold means increases the deceleration threshold as a function of the measured wheel speed.

14. The controller of claim 10, further comprising means for detecting a lock-up condition by comparing the wheel speed signal with a reference signal.

15. The controller of claim 14, wherein the reference signal is represented by the wheel speed signal after having been rate limited in accordance with a predefined maximum rate at which the vehicle could be decelerated.

16. An antiskid brake controller for controlling a braking operation of a wheel of a vehicle based on a wheel speed signal provided by a wheel speed sensor coupled to the wheel, the controller comprising:

means for estimating a deceleration of the wheel based on the wheel speed signal provided by the wheel speed sensor;

adaptive deceleration threshold means for providing a deceleration threshold which varies in accordance with a prescribed criteria;

comparison means for comparing the estimated deceleration of the wheel with the deceleration threshold, wherein the deceleration threshold being adaptive to braking conditions by increasing or decreasing in increments which vary in size as a function of a difference between the estimated deceleration and the deceleration threshold; and output means for providing a control signal for adjusting a brake force applied to the wheel based on the comparison, wherein the adaptive deceleration threshold means increases the deceleration threshold as a function of the measured wheel speed and multiplies a nominal deceleration threshold by a scaling factor including the measured wheel speed to obtain the deceleration threshold.

17. A method for controlling a braking operation of a wheel of a vehicle based on a wheel speed signal provided by a wheel speed sensor coupled to the wheel, the method comprising the steps of:

estimating a deceleration of the wheel based on the wheel speed signal provided by the wheel speed sensor;

comparing the estimated deceleration of the wheel with a predefined deceleration threshold adaptive to braking conditions, the predefined deceleration threshold being adaptive to braking conditions by increasing or decreasing in increments which vary in size as a function of a difference between the estimated deceleration and the predefined deceleration threshold; and providing a control signal for adjusting a brake force applied to the wheel based on the comparison, the control signal functioning to decrease the brake force applied to the wheel at a rate which is greater than a rate at which the control signal increases the brake force applied to the wheel.

18. The method of claim 17, wherein the control signal causes the brake force applied to the wheel to be decreased in larger increments than it is increased based on the comparison.

19. The method of claim 17, further comprising detecting a lock-up condition by comparing the wheel speed signal with a reference signal.

20. The method of claim 19, wherein the reference signal is represented by the wheel speed signal after having been rate limited in accordance with a predefined maximum rate at which the vehicle could be decelerated.

21. A method for controlling a braking operation of a wheel of a vehicle based on a wheel speed signal provided by a wheel speed sensor coupled to the wheel, the method comprising the steps of:

estimating a deceleration of the wheel based on the wheel speed signal provided by the wheel speed sensor;

providing a deceleration threshold which varies in accordance with a prescribed criteria, whereby the deceleration threshold increases or decreases in increments which vary in size as a function of a difference between the estimated deceleration and the predefined deceleration threshold;

comparing the estimated deceleration of the wheel with the deceleration threshold; and providing a control signal for adjusting a brake force applied to the wheel based on the comparison.

22. The method of claim 21, wherein the deceleration threshold is varied based on whether the estimated deceleration falls within a prescribed range of the deceleration threshold from a previous interval.

23. The method of claim 21, wherein a rate at which the deceleration threshold is increased is less than a rate a which the deceleration threshold is decreased.

24. The method of claim 21, wherein the deceleration threshold is increased as a function of the measured wheel speed.

25. The method of claim 24, wherein a nominal deceleration threshold is multiplied by a scaling factor including the measured wheel speed to obtain the deceleration threshold.

26. The method of claim 21, further comprising detecting a lock-up condition by comparing the wheel speed signal with a reference signal.

27. The method of claim 26, wherein the reference signal is represented by the wheel speed signal after having been rate limited in accordance with a predefined maximum rate at which the vehicle could be decelerated.

28. An antiskid brake controller for controlling a braking operation of a wheel of a vehicle based on a wheel speed signal provided by a wheel speed sensor coupled to the wheel, the controller comprising:

circuitry which estimates a deceleration of the wheel based on the wheel speed signal provided by the wheel speed sensor;

circuitry which compares the estimated deceleration of the wheel with a predefined deceleration threshold adaptive to braking conditions, the predefined deceleration threshold being adaptive to braking conditions by increasing or decreasing in increments which vary in size as a function of a difference between the estimated deceleration and the predefined deceleration threshold; and an output circuit which provides a control signal for adjusting a brake force applied to the wheel based on the comparison, the control signal functioning to decrease the brake force applied to the wheel at a rate which is greater than a rate at which the control signal increases the brake force applied to the wheel.

29. The controller of claim 28, wherein the control signal causes the brake force applied to the wheel to be decreased in larger increments than the brake force is increased based on the comparison.

30. The controller of claim 29, wherein the output circuit comprises a first rate limiter and a first gain amplifier for causing the control signal to be decreased at a first rate based on the comparison, and a second rate limiter and second gain amplifier for causing the control signal to be increased at a second rate based on the comparison, the first rate being greater than the second rate.

31. The controller of claim 28, further comprising a circuit for generating the predefined deceleration threshold.

32. The controller of claim 31, wherein the circuit for generating is adaptive to vary the predefined deceleration threshold based on the wheel speed signal.

33. The controller of claim 32, wherein the circuit for generating varies the predefined deceleration threshold based on a difference between the estimated deceleration and the predefined deceleration threshold from a previous interval.

34. The controller of claim 31, wherein the circuit for generating varies the predefined deceleration threshold using a scaling factor incorporating the measured wheel speed represented by the wheel speed signal.

35. The controller of claim 28, further comprising circuitry for detecting a lock-up condition by comparing the wheel speed signal with a reference signal.

36. The controller of claim 35, wherein the reference signal is represented by the wheel speed signal after having been rate limited in accordance with a predefined maximum rate at which the vehicle could be decelerated.

37. An antiskid brake controller for controlling a braking operation of a wheel of a vehicle based on a wheel speed signal provided by a wheel speed sensor coupled to the wheel, the controller comprising:

circuitry which estimates a deceleration of the wheel based on the wheel speed signal provided by the wheel speed sensor;

threshold circuitry which provides a deceleration threshold which varies in accordance with a prescribed criteria, whereby the deceleration threshold increases or decreases in increments which vary in size as a function of a difference between the estimated deceleration and the predefined deceleration threshold;

circuitry which compares the estimated deceleration of the wheel with the deceleration threshold; and an output circuit which provides a control signal for adjusting a brake force applied to the wheel based on the comparison.

38. The controller of claim 37, wherein the circuitry varies the deceleration threshold based on whether the estimated deceleration falls within a prescribed range of the deceleration threshold from a previous interval.

39. The controller of claim 37, wherein a rate at which the threshold circuitry increases the deceleration threshold is less than a rate a which the threshold circuitry decreases the deceleration threshold.

40. The controller of claim 37, wherein the threshold circuitry increases the deceleration threshold as a function of the measured wheel speed.

41. The controller of claim 40, wherein the threshold circuitry multiplies a nominal deceleration threshold by a scaling factor including the measured wheel speed to obtain the deceleration threshold.

42. The controller of claim 37, further comprising a circuit for detecting a lock-up condition by comparing the wheel speed signal with a reference signal.

43. The controller of claim 42, wherein the reference signal is represented by the wheel speed signal after having been rate limited in accordance with a predefined maximum rate at which the vehicle could be decelerated.

* * * * *